United States Patent
Won et al.

(10) Patent No.: US 10,728,737 B2
(45) Date of Patent: *Jul. 28, 2020

(54) UE MONITORING CONFIGURATION METHOD AND APPARATUS

(71) Applicant: Samsung Electronics Co., Ltd., Suwon-si, Gyeonggi-do (KR)

(72) Inventors: Sung Hwan Won, Seoul (KR); Sunghoon Kim, Suwon-si (KR); Songyean Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/422,183

(22) Filed: May 24, 2019

(65) Prior Publication Data

US 2019/0281439 A1 Sep. 12, 2019

Related U.S. Application Data

(63) Continuation of application No. 15/928,727, filed on Mar. 22, 2018, now Pat. No. 10,306,458, which is a
(Continued)

(51) Int. Cl.
*H04W 8/04* (2009.01)
*H04W 4/70* (2018.01)
*H04W 24/10* (2009.01)

(52) U.S. Cl.
CPC .............. *H04W 8/04* (2013.01); *H04W 4/70* (2018.02); *H04W 24/10* (2013.01)

(58) Field of Classification Search
CPC ............................. H04M 15/00; H04L 69/16
(Continued)

(56) References Cited

U.S. PATENT DOCUMENTS

2011/0270973 A1 11/2011 Liao
2013/0017821 A1* 1/2013 Balasubramanian ........................
H04L 41/5025
455/422.1
(Continued)

FOREIGN PATENT DOCUMENTS

CN 102413485 A 4/2012
CN 102652412 A 8/2012
(Continued)

OTHER PUBLICATIONS

3GPP; 3rd Generation Partnership Project; Technical Specification Group Radio Access Network; Evolved Universal Terrestrial Radio Access (E-UTRA); Radio Resource Control (RRC); Protocol specification (Release 12); 3GPP TS 36.331 V12.1.0; Mar. 2014; Valbonne, France.
(Continued)

*Primary Examiner* — Kiet M Doan
(74) *Attorney, Agent, or Firm* — Jefferson IP Law, LLP

(57) ABSTRACT

A method and an apparatus for configuring a function of monitoring events concerning user equipment (UE) are provided. The method of a home subscriber server (HSS) includes receiving a first request message including monitoring event information from a service capability exposure function (SCEF), setting, if the monitoring event information is set to loss of connectivity, a mobility-related timer of a terminal to a value based on a value of a maximum detection time included in the first request message, and transmitting a second request message including the monitoring event information and the set mobility-related timer of the terminal to a mobility management entity.

16 Claims, 6 Drawing Sheets

Related U.S. Application Data continuation of application No. 15/153,145, filed on May 12, 2016, now Pat. No. 9,930,516.

(60) Provisional application No. 62/161,991, filed on May 15, 2015.

(58) Field of Classification Search
USPC .... 370/252, 225, 331, 315; 455/404.1, 63.1, 455/422.1, 435.1, 414.2, 436, 456.2, 450, 455/417; 379/38, 40
See application file for complete search history.

(56) References Cited

U.S. PATENT DOCUMENTS

| | | | |
|---|---|---|---|
| 2014/0098761 A1 | 4/2014 | Lee et al. | |
| 2014/0134996 A1 | 5/2014 | Barclay et al. | |
| 2015/0124777 A1 | 5/2015 | Kim et al. | |
| 2015/0249900 A1 | 9/2015 | Kim et al. | |
| 2015/0264512 A1 | 9/2015 | Jain et al. | |
| 2015/0326619 A1* | 11/2015 | Lau | H04L 65/1073 370/328 |
| 2015/0365361 A1* | 12/2015 | Tomlinson | H04L 51/04 709/206 |
| 2015/0365914 A1 | 12/2015 | Yu et al. | |
| 2016/0007316 A1 | 1/2016 | Vaidya et al. | |
| 2016/0142860 A1 | 5/2016 | Kim et al. | |
| 2016/0142981 A1 | 5/2016 | Yi et al. | |
| 2016/0205659 A1 | 7/2016 | Bergman et al. | |
| 2016/0205660 A1 | 7/2016 | Ryu et al. | |
| 2016/0205661 A1 | 7/2016 | Ryu et al. | |
| 2016/0212727 A1 | 7/2016 | Hu et al. | |
| 2016/0353440 A1 | 12/2016 | Lee et al. | |
| 2017/0019878 A1 | 1/2017 | Hu et al. | |
| 2017/0064670 A1 | 3/2017 | Shen et al. | |
| 2017/0171694 A1 | 6/2017 | Liu et al. | |
| 2017/0230817 A1* | 8/2017 | Ryu | H04W 28/02 |
| 2017/0238302 A1 | 8/2017 | Futaki | |
| 2017/0245241 A1 | 8/2017 | Yu et al. | |
| 2017/0257845 A1 | 9/2017 | Hu et al. | |
| 2017/0264399 A1 | 9/2017 | Li et al. | |
| 2017/0272895 A1 | 9/2017 | Park et al. | |
| 2017/0280481 A1 | 9/2017 | Stern-Berkowitz et al. | |
| 2017/0290016 A1 | 10/2017 | Yi et al. | |
| 2017/0303064 A1 | 10/2017 | Park et al. | |
| 2017/0311232 A1 | 10/2017 | Yi et al. | |
| 2017/0311355 A1 | 10/2017 | Yi et al. | |
| 2017/0339667 A1 | 11/2017 | Shen et al. | |
| 2017/0347335 A1 | 11/2017 | Yi et al. | |
| 2017/0374542 A1 | 12/2017 | Ryu et al. | |
| 2018/0007658 A1 | 1/2018 | Shen et al. | |
| 2018/0070257 A1 | 3/2018 | Mochizuki et al. | |
| 2018/0115923 A1* | 4/2018 | Chandramouli | H04W 88/182 |
| 2018/0152913 A1 | 5/2018 | Hu et al. | |
| 2018/0242246 A1 | 8/2018 | Ryu et al. | |
| 2018/0263015 A1 | 9/2018 | Burbidge et al. | |
| 2018/0368038 A1 | 12/2018 | Reddiboyana et al. | |
| 2019/0037569 A1 | 1/2019 | Lee et al. | |
| 2019/0090152 A1 | 3/2019 | Mochizuki et al. | |
| 2019/0174294 A1 | 6/2019 | Ryu et al. | |

FOREIGN PATENT DOCUMENTS

| | | |
|---|---|---|
| CN | 104137635 A | 11/2014 |
| CN | 104349290 A | 2/2015 |
| WO | 2013/165168 A1 | 11/2013 |
| WO | 2014/051260 A | 4/2014 |
| WO | 2014/061911 A1 | 4/2014 |
| WO | 2014/071171 A2 | 5/2014 |
| WO | 2014/107381 A1 | 7/2014 |
| WO | 2015/012654 A1 | 1/2015 |

OTHER PUBLICATIONS

Huawei; Consideration on Paging for MTC; 3GPP TSG-RAN WG3 Meeting #87; R3-150063; Feb. 9-13, 2015; Athens, Greece.

3rd Generation Partnership Project; Technical Specification Group Services and System Aspects; General Packet Radio Service (GPRS) enhancements for Evolved Universal Terrestrial Radio Access Network (E-UTRAN) access (Release 13); 3GPP TS 23.401 V13.2.0; Mar. 2015; Valbonne, France.

Samsung; Paging Optimization for Rel-13 Low Complexity MTC; 3GPP TSG RAN WG2 #89bis; R2-151641; Apr. 20-24, 2015; Bratislava, Slovakia.

3rd Generation Partnership Project; Technical Specification Group Services and System Aspects; General Packet Radio Service (GPRS) enhancements for Evolved Universal Terrestrial Radio Access Network (E-UTRAN) access (Release 13); 3GPP TS 23.401 V13.6.0; Mar. 2016; Valbonne, France.

Alcatel-Lucent; Response to R3-150063 on Paging for MTC; 3GPP TSG-RAN WG3 Meeting #87; R3-150352 Feb. 9-13, 2015; Athens, Greece.

Huawei et al., "Introduction of Monitoring Procedures", 30PP Draft, S2-151276 MONTE VIA SGSN-MME-HSS for 682 V13, vol. SA WG2, No. San Jose Del Cabo, Mexico, Apr. 18, 2015 (Apr. 18, 2015), XP050962578.

"3rd Generation Partnership Project; Technical Specification Group Services and System Aspects; Architecture enhancements to facilitate communications with packet data networks and applications (Release 13)", 30PP Standard; 30PP TS 23.682, vol. SA WG2, No. V13.2.0, Jun. 18, 2015 (Jun. 18, 2015), pp. 1-70, XP050966257.

European Search Report dated Apr. 18, 2018, issued in European Patent Application No. 16796724.9-1215.

U.S. Office Action dated Aug. 10, 2018, issued in a counterpart U.S. Appl. No. 15/555,807.

Huawei et al: "Introduction of monitoring event removal and recall procedures", 3GPP Draft; S2-150876_MONTE RECALL V2, vol. SA WG2, No. San Jose Del Cabo, Mexico; Apr. 13, 2015-Apr. 17, 2015 Apr. 13, 2015 (Apr. 13, 2015), XP050942758.

"3rd Generation Partnership Project; Technical Specification Group Services and System Aspects; Architecture Enhancements for Service Capability Exposure (Release 13)", 3GPP Standard; 3GPP TR 23.708, vol. SA WG2, No. V1.2.0, Apr. 29, 2015 (Apr. 29, 2015), pp. 1-31, XP050966450.

European Office Action dated Jan. 15, 2019, issued in European Application No. 16796724.9.

U.S. Office Action dated Feb. 21, 2019, issued in U.S. Appl. No. 15/555,807.

"[93#30] [L TE/NB-IOT] CR for 36.331 (Huawei)", 3GPP Draft; R2-162069_ 36331 Running CR for NB-IOT-Implementation-V1, 3rd Generation Partnership Project (3GPP), vol. RAN WG2, No. Malta; Feb. 15, 2016-Feb. 20, 2016 Mar. 7, 2016 (Mar. 7, 2016), XP051081860.

"3rd Generation Partnership Project; Technical Specification Group Core Network and Terminals; Non-Access-Stratum (NAS) protocol for Evolved Packet System (EPS); Stage 3 (Release 13)", vol. CT WG1, No. V13.1.0, Mar. 20, 2015 (Mar. 20, 2015), pp. 1-384, XP050927892, [retrieved on Mar. 20, 2015].

European Office Action dated Dec. 17, 2019, issued in European Application No. 16765208.0.

European Office Action dated Feb. 4, 2020, issued in European Application No. 16796724.9.

Chinese Office Action dated Apr. 27, 2020, issued in Chinese Application No. 201680022328.0.

Chinese Office Action dated Apr. 29, 2020, issued in Chinese Application No. 201680015179.5.

U.S. Office Action dated Apr. 13, 2020, issued in U.S. Appl. No. 15/555,807.

* cited by examiner

UE MONITORING CONFIGURATION METHOD AND APPARATUS

CROSS-REFERENCE TO RELATED APPLICATION(S)

This application is a continuation application of prior application Ser. No. 15/928,727, filed on Mar. 22, 2018, which is a continuation application of prior application Ser. No. 15/153,145, filed on May 12, 2016, which has issued as U.S. Pat. No. 9,930,516 on Mar. 27, 2018 and was based on and claimed priority under 35 U.S.C. § 119(e) of a U.S. Provisional application Ser. No. 62/161,991, filed on May 15, 2015, in the U.S. Patent and Trademark Office, the disclosure of which is incorporated by reference herein in its entirety.

TECHNICAL FIELD

The present disclosure relates to a mobile communication system. More particularly, the present disclosure relates to a method and apparatus for configuring a function of monitoring events concerning user equipment (UE).

BACKGROUND

In order to meet the increasing wireless data traffic demand since the commercialization of 4th generation (4G) communication systems, the development focus is on the 5th generation (5G) or pre-5G communication system. For this reason, the 5G or pre-5G communication system is called a beyond 4G network communication system or a post long term evolution (LTE) system. In order to accomplish a high data rate, it is considered to implement the 5G communication system using a millimeter wave (mmWave) band (e.g., 60 GHz band). In order to mitigate propagation loss and increase propagation distance, the 5G communication system is likely to accommodate various techniques such as beamforming, massive multiple-input multiple-output (MIMO), full dimensional MIMO (FD-MIMO), array antenna, analog beamforming, and large scale antenna. Also, for throughput enhancement of the 5G communication system, research is being conducted on various techniques such as small cell, advanced small cell, cloud radio access network (cloud RAN), ultra-dense network, device to device communication (D2D), wireless backhaul, moving network, cooperative communication, coordinated multi-points (CoMP), and interference cancellation. Furthermore, the ongoing researches include the use of hybrid frequency-shift keying (FSK) and quadrature amplitude modulation (QAM) modulation and sliding window superposition coding (SWSC) as advanced coding modulation (ACM) scheme, filter bank multi carrier (FBMC), non-orthogonal multiple access (NOMA), and sparse code multiple access (SCMA).

Meanwhile, the Internet is evolving from the human-centric communication network in which information is generated and consumed by human to the Internet of things (IoT) in which distributed things or components exchange and process information. The combination of the cloud server-based big data processing technology and the IoT begets Internet of Everything technology. In order to secure the sensing technology, wired/wireless communication and network infrastructure, service interface technology, and security technology required for implementing the IoT, recent research is focused on the sensor network, machine to machine (M2M), and machine type communication (MTC) technologies. In the IoT environment, it is possible to provide an intelligent Internet technology (IT) which is capable of collecting and analyzing data generated from the connected things to create new values for human life. The IoT can be applied to various fields such as a smart home, a smart building, a smart city, a smart car or a connected car, a smart grid, health care, a smart appliance, and a smart medical service, through legacy information technology (IT) and convergence of various industries.

Thus, there are various attempts to apply the IoT to the 5G communication system. For example, the sensor network, M2M, and MTC technologies are implemented by means of the 5G communication technologies such as beamforming, MIMO, and array antenna. The application of the aforementioned cloud RAN as a big data processing technology is an example of convergence between the 5G and IoT technologies.

Meanwhile, the necessity for monitoring a user equipment (UE) which has acquired a communication capability from the mobile communication system is on the rise, and various monitoring configuration schemes are considered to achieve this object.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method for configuring a function of monitoring events occurring at a user equipment (UE) which has acquired a communication capability.

Another aspect of the present disclosure is to provide a method for updating subscriber information when the communication pattern of the UE is changed.

In accordance with an aspect of the present disclosure, a method of a home subscriber server (HSS) is provided. The method includes receiving a first request message including monitoring event information from a service capability exposure function (SCEF), setting, if the monitoring event information is set to loss of connectivity, a mobility-related timer of a terminal to a value based on a value of a maximum detection time included in the first request message, and transmitting a second request message including the monitoring event information and the set mobility-related timer of the terminal to a mobility management entity.

In accordance with another aspect of the present disclosure, a method of an SCEF is provided. The method includes receiving a first request message including monitoring event information from an external server, and transmitting a second request message including the monitoring event information to an HSS, wherein the first and second request messages include, if the monitoring event information is set to loss of connectivity, a maximum detection time, and the mobility-related timer of a terminal is set by the HSS to a value based on a value of the maximum detection time and a third request message including the monitoring event information and the set mobility-related timer of the terminal is transmitted from the HSS to the mobility management entity.

In accordance with another aspect of the present disclosure, an HSS is provided. The HSS includes a transceiver configured to transmit and receive signals to and from an SCEF and a mobility management entity, and a control unit configured to control the transceiver to receive a first request message including monitoring event information from the SCEF, set, if the monitoring event information is set to loss of connectivity, a mobility-related timer of a terminal to a value based on a value of a maximum detection time included in the first request message, and control the transceiver to transmit a second request message including the monitoring event information and the set mobility-related timer of the terminal to the mobility management entity.

In accordance with still another aspect of the present disclosure, an SCEF is provided. The SCEF includes a transceiver configured to transmit and receive signals to and from an external server and an HSS, and a control unit configured to control the transceiver to receive a first request message including monitoring event information from the external server and transmit a second request message including the monitoring event information to the HSS, wherein the first and second request messages include, if the monitoring event information is set to loss of connectivity, a maximum detection time, and the mobility-related timer of a terminal is set by the HSS to a value based on a value of the maximum detection time and a third request message including the monitoring event information and the set mobility-related timer of the terminal is transmitted from the HSS to the mobility management entity.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
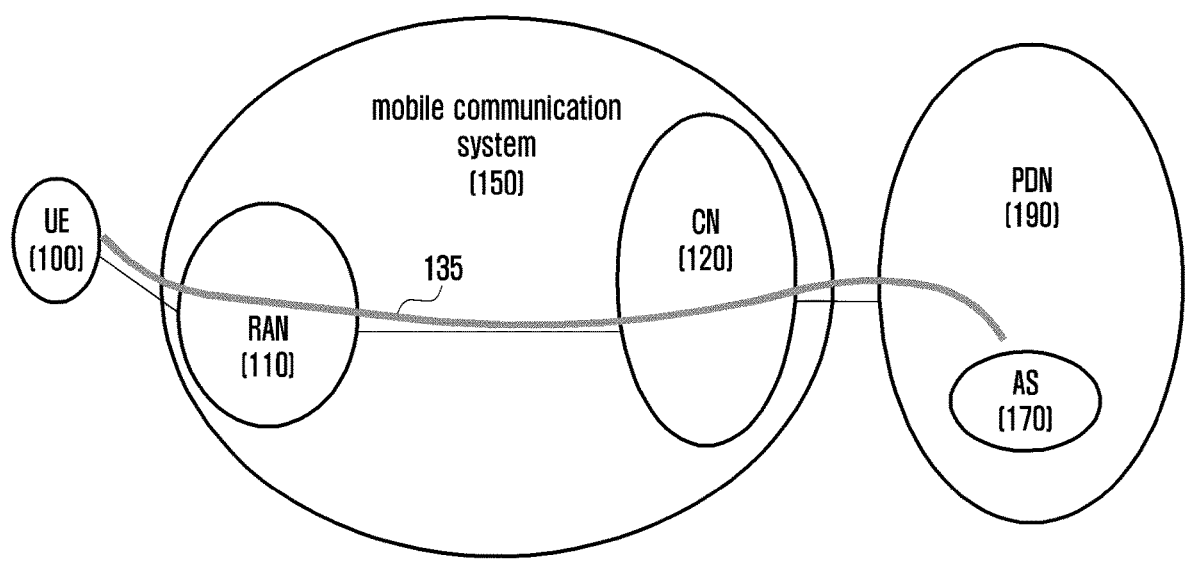
FIG. 1 is a diagram illustrating a mobile communication system which connects a user equipment (UE) to an external server according to an embodiment of the present disclosure.

FIG. 1 is a diagram illustrating a mobile communication system which connects a user equipment (UE) to an external server according to an embodiment of the present disclosure.

Referring to FIG. 1, although the various embodiments of the present disclosure are directed to long term evolution (LTE) and evolved packet core (EPC) represented by a radio access network (RAN) 110 and a core network (CN) 120 of FIG. 1 as standardized by the $3^{rd}$ generation partnership project (3GPP), it will be understood by those skilled in the art that the present disclosure can be applied even to other communication systems having the similar technical background and channel format, with a slight modification, without departing from the spirit and scope of the present disclosure. A UE 100 may communicate with various application servers (ASs) 170 located in a public data network (PDN) 190. The UE 100 and the AS 170 communicate through a communication path represented by a line 135 in a mobile communication system 150.

In various embodiments of the present disclosure, every operation and message may be selectively performed or omitted. In every embodiment of the present disclosure, two successive operations may be performed substantially at the same time or in reverse order. Also, messages may be transmitted at the same time or in a different sequential order. Every operation and message may be performed independently.

Some or all of the disclosures described below are provided to help understand the present disclosure. Accordingly, the detailed descriptions of the disclosures are to express part of the method and apparatus proposed in the present invention. That is, it is preferred to approach the content of the specification semantically rather than syntactically. Although various embodiments of the present disclosure have been described using specific terms, the specification and drawings are to be regarded in an illustrative rather than a restrictive sense in order to help understand the present disclosure. It is obvious to those skilled in the art that various modifications and changes can be made thereto without departing from the broader spirit and scope of the disclosure.

Figure 2:
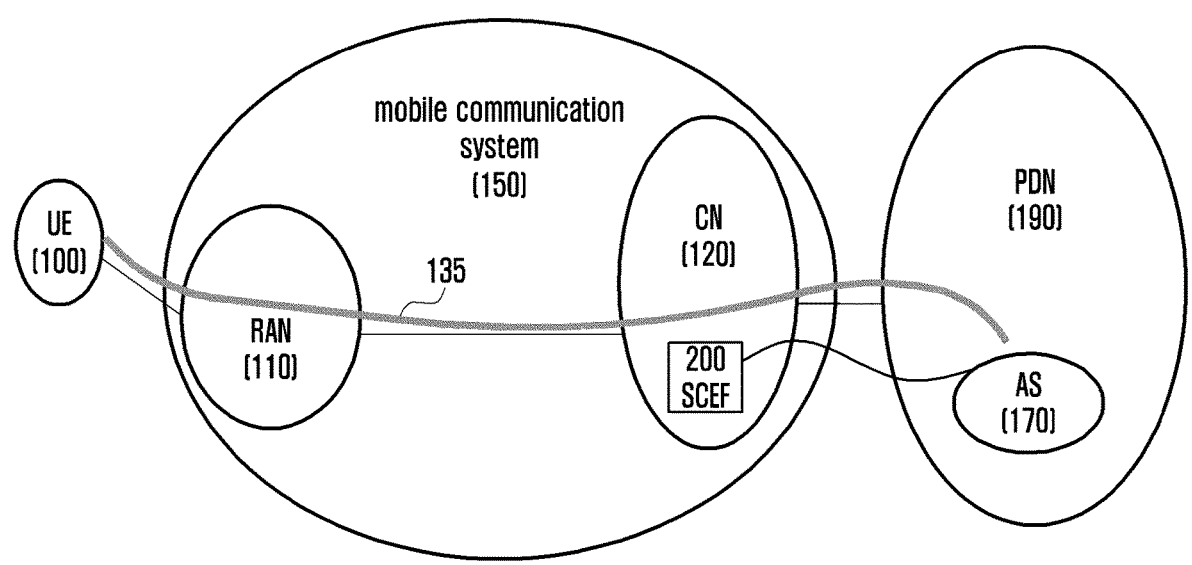
FIG. 2 is a diagram illustrating a mobile communication system having a service capability exposure function (SCEF) for exposing service capabilities to an external server (e.g., application server (AS)) according to an embodiment of the present disclosure.

FIG. 2 is a diagram illustrating a mobile communication system having a service capability exposure function (SCEF) for exposing service capabilities to an external server (e.g., AS) according to an embodiment of the present disclosure.

Referring to FIG. 2, the UE 100, which has acquired a communication capability from the mobile communication system 150, may communicate with ASs 170 located on the PDN 190. The communication link between the UE 100 and the AS 170 via the RAN 110 and the CN 120 is represented by the line 135. It may be possible for the AS 170 to provide the UE 100 with various services only through (application level) communication. However, the AS 170 may exchange supplementary information with the mobile communication system 150 to provide the UE 100 with more suitable services. For example, the mobile communication system 150 may notify the AS 170 of attachment/detachment of a subscriber identity module (SIM) to the UE 100 such that the AS 170 provides the UE 100 with situation-specific management services.

The AS 170 and the mobile communication system 150 may be owned by different operators. Accordingly, the AS 170 may not be allowed to exchange information directly with the entities of the mobile communication systems 150 for security reasons. In order to address this issue, 3GPP release 13 adopts SCEF which, as implied from its name, is an entity for securely exposing the service capabilities supported by the mobile communication system 150 to the (external) AS 170. The AS 170 receives the information on the service capabilities of the mobile communication system 150 from an SCEF 200.

In an embodiment of the present disclosure, the mobile communication system 150 is provided with a method for configuring a function of monitoring events occurring at UEs and transmitting relevant information to the AS 170 via the SCEF 200.

Figure 3:
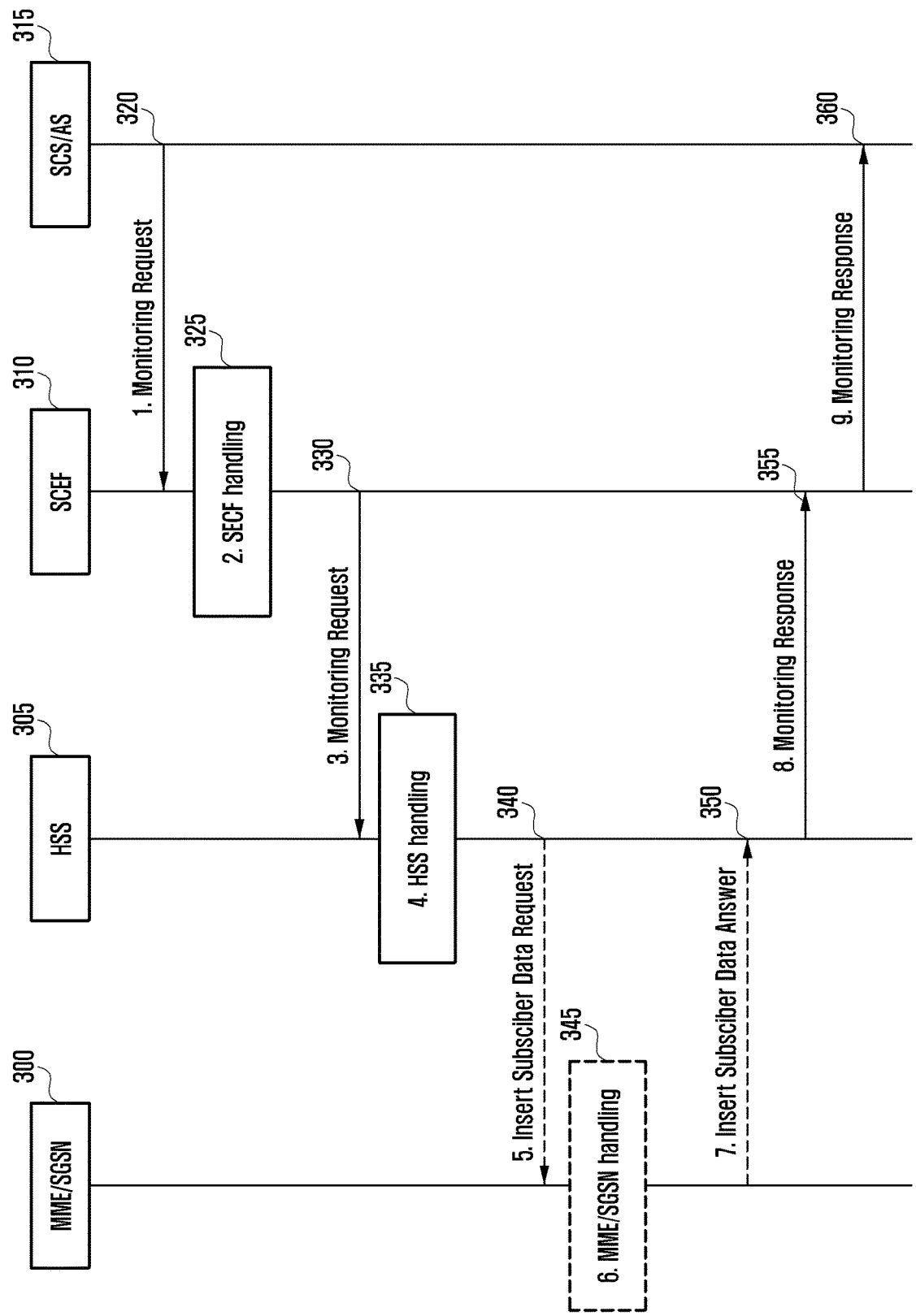
FIG. 3 is a signal flow diagram illustrating a UE monitoring configuration method according to an embodiment of the present disclosure.

FIG. 3 is a signal flow diagram illustrating a UE monitoring configuration method according to an embodiment of the present disclosure.

Referring to FIG. 3, an AS 315 may send an SCEF 310 a Monitoring Request message at operation 320. The AS 315 may transmit the Monitoring Request message to the SCEF 310 directly or via a service capability server (SCS). For explanation convenience, an external entity which exchanges information with the SCEF 310 is referred to as SCS/AS 315. The SCS may include a platform supporting at least one application service.

The Monitoring Request message transmitted by the SCS/AS 315 may include at least one of the following parameters:
  SCS/AS identification (ID)
  SCS/AS reference ID
  monitoring type
  UE ID (external ID or MSISDN)
  monitoring duration
  maximum detection time The SCS/AS ID is the identifier of the SCS/AS 315 which transmits the Monitoring Request message, and the SCS/AS Reference ID is the identifier of the monitoring transaction between the SCS/AS 315 and SCEF 310.

The monitoring type is the information indicating a UE monitoring event in the form of a parameter representing the type of information which the SCS/AS 315 wants to receive from the mobile communication system. For example, the monitoring type may be classified into at least one of followings:
  Loss of connectivity: To monitor UEs for an event of detecting an unreachable UE in the mobile communication system and, when such an event is detected, report the event.
  Location reporting: To monitor UEs for an event in which a predetermined criterion of a UE is fulfilled (e.g., cell change and tracking area change occurs) and, when such an event is detected, report the event.

The UE ID may be an identifier which can be used at the application level. The UE ID may be a phone number (MSISDN) or other types of external ID (e.g., email address).

The monitoring duration is a parameter indicating a time period for the mobile communication system to monitor for the event indicated by the monitoring type. Preferably, this parameter may be set to an absolute time (e.g. 14:00 April 14 2016). The reason is as follows. The mobile communication system entities joining the monitoring may include a mobility management entity/serving general packet radio service (GPRS) support node (MME/SGSN) 300. The MME/SGSN serving the UE may change as the UE roams. Accordingly, if the monitoring duration is provided in a non-absolute value format (e.g., 3 hours), the UE which moves to another MME/SGSN has to laboriously inform of the period reduced as much as the time during which it has been served by the old MME/SGSN. Furthermore, it is difficult to check the signaling delay time for moving to the new MME/SGSN and thus may cause inaccuracy problem.

The maximum detection time is a parameter included in the Monitoring Request message, only when the monitoring type is set to loss of connectivity, to indicate a maximum monitoring period for monitoring communication with the UE. If there is no communication with the UE during the maximum detection time, it may be reported to the SCS/AS 315 that the corresponding UE is unreachable. The maximum detection time may correspond to a mobile reachability timer of the mobile communication system.

The Monitoring Request message transmitted by the SCS/AS 315 may further include a parameter commanding the deletion of the monitoring configuration. The monitoring configuration deletion command may be transmitted along with the SCS/AS reference ID used in configuring the monitoring service.

The SCEF 310 performs authorization on the Monitoring Request message at operation 325. For example, the SCEF 310 may check whether the SCS/AS 315, which has transmitted the Monitoring Request message, is authorized for Monitoring Request. If the SCS/AS 315 is authorized successfully, the SCEF 310 may generate an SCEF reference ID corresponding to the SCS/AS reference ID.

The SCEF 310 may transmit the Monitoring Request message to a home subscriber server (HSS) 305 at operation 330. The Monitoring Request message transmitted at this operation may include at least one of the following parameters:
  SCEF ID
  SCEF reference ID
  monitoring type,
  UE ID (external ID or MSISDN)
  monitoring duration
  maximum detection time The SCEF ID is an identifier of the SCEF 310 which transmits the Monitoring Request message, and the SCEF reference ID is a parameter related to the received SCS/AS reference ID. The monitoring type, UE ID, monitoring duration, and maximum detection time are parameters received from the SCS/AS 315.

Meanwhile, the Monitoring Request message transmitted by the SCEF 310 may further include a monitoring configuration deletion parameter generated based on the parameter commanding the deletion of the monitoring configuration which is previously received from the SCS/AS 315.

The HSS 305 may perform authorization on the received Monitoring Request message at operation 335. For example, the HSS 305 may check whether a parameter included in the Monitoring Request message has a value in a range acceptable by the operator.

The HSS 305 may send the MME/SGSN 300 an Insert Subscriber Data Request message at operation 340. The insert subscriber data request message may include subscriber information containing at least one of the following parameters:

SCEF ID
SCEF reference ID
monitoring type
monitoring duration
subscribed periodic TAU/RAU timer The SCEF ID, SCEF reference ID, monitoring type, and monitoring duration are parameters received from the SCEF 310. The tracking area update/routing area update (TAU/RAU) timer is a timer for use in receiving a periodic TAU/RAU message from the UE in association with mobility of the UE.

As described with operation 320, the maximum detection time corresponds to a mobility reachability timer of the mobile communication system, and the HSS 305 cannot generate the mobility reachability timer value to the MME/SGSN 300. However, the MME/SGSN 300 may determine the mobile reachability timer value based on the subscribed periodic TAU/RAU timer value included in the insert subscriber data request message.

Accordingly, the HSS 305 may adjust the subscriber periodic TAU/RAU timer value such that the MME/SGSN sets the mobile reachability timer to a value equal to the maximum detection time under the assumption that the MME/SGSN 300 determines the mobile reachability timer value based on the subscribed periodic TAU/RAU timer value.

In greater detail, the MME/SGSN 300 typically sets the mobile reachability timer to a value greater than that of the subscribed periodic TAU/RAU timer. Here, the mobile reachability timer value may be set to a relatively large value depending on the mobile communication system, area, or vendor (e.g. the mobile reachability timer may be set to a default value of 4 minutes). The HSS 305 may set the subscribed periodic TAU/RAU timer to a value less than the maximum detection time based on the above setting.

Meanwhile, the Insert Subscriber Data Request message transmitted by the HSS 305 may include the monitoring configuration deletion parameter received from the SCEF 310.

The MME/SGSN 300 may perform authorization on the monitoring-related parameter included in the received subscriber information at operation 345. The MME/SGSN 300 may set the subscribed periodic TAU/RAU timer to the same value as the periodic TAU/RAU timer value of the UE. It may also be possible to set the mobile reachability timer to a value according to the (subscribed) periodic TAU/RAU timer value. Afterward, the MME/SGSN 300 may monitor the mobility reachability timer for expiry and, if the timer expires, notify the SCS/AS 315 of the expiry of the timer via the SCEF 310.

The MME/SGSN 300 may delete the monitoring configuration based on the received monitoring configuration deletion parameter.

The MME/SGSN 300 may send the HSS 305 an Insert Subscriber Data Response message at operation 350 after the monitoring configuration is performed successfully.

The HSS 305 may send the SCEF 310 a Monitoring Response message to acknowledge the receipt of the Monitoring Request message or deletion of the monitoring configuration at operation 355.

The SCEF 310 may forward the Monitoring Response message to the SCS/AS 315 to acknowledge the receipt of the Monitoring Request message or deletion of the monitoring configuration at operation 360.

Figure 4:
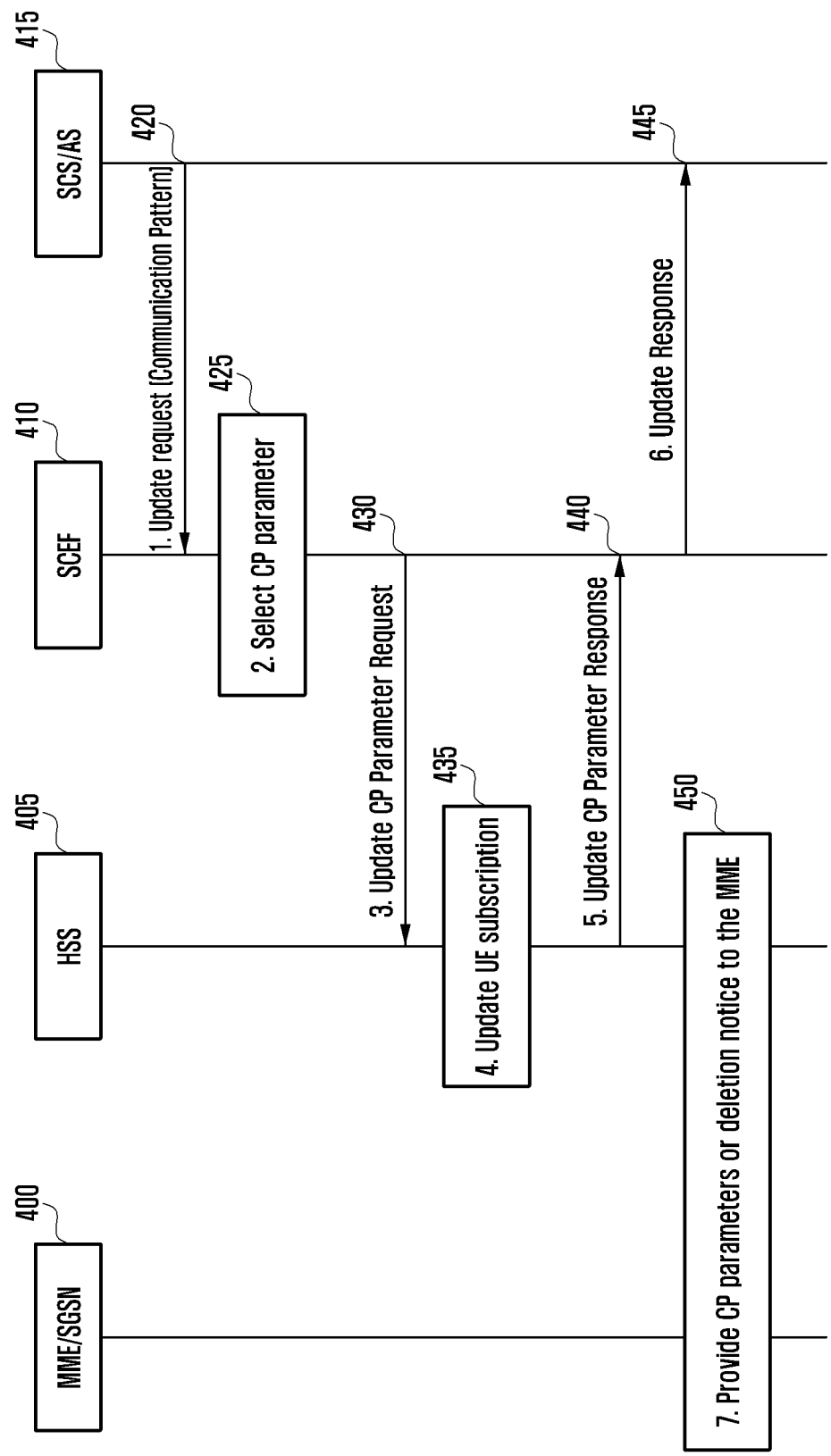
FIG. 4 is a signal flow diagram illustrating a subscriber information update method, when the UE communication pattern is changed, according to an embodiment of the present disclosure.

FIG. 4 is a signal flow diagram illustrating a subscriber information update method, when the UE communication pattern is changed, according to an embodiment of the present disclosure. The UE communication pattern may include at least one of a traffic communication pattern and a UE mobility communication pattern.

Table 1 shows communication pattern parameters related to the data traffic communication pattern.

TABLE 1

| Communication pattern parameter | Description |
| --- | --- |
| 1) Periodic communication indicator | TRUE: The UE communicates periodically/False: No periodic communication, only on demand. |
| 2) Communication duration timer | Duration interval time of periodic communication [optional, may be used together with 1)] Example: every 5 minutes |
| 3) Periodic time | Interval Time of periodic communication [optional, may be used together with 1)] Example: every hour |
| 4) Scheduled communication time | Time zone and Day of the week when the UE is available for communication [optional] Example: Time: 13:00-20:00, Day: Monday |

Table 2 shows communication pattern parameters related to the UE mobility communication pattern.

TABLE 2

| Communication pattern parameter | Description |
| --- | --- |
| 1) Stationary indication | TRUE: The UE is stationary/False: The UE is mobility [optional] |

Referring to FIG. 4, an SCS/AS 415 may send the communication pattern information of the UE via an SCEF 410 at operation 420. The communication pattern information may include the aforementioned parameters. If the communication pattern parameters are changed, the SCS/AS 415 may send the SCEF 410 an update request message including the communication pattern information of the UE. The mobile communication system may optimize various parameters and operations of the entities based on the communication pattern. The communication pattern information of the UE may be transmitted along with validity time. The validity time may denote the time period during which when the communication pattern is valid. If the validity time expires, an HSS 405 and/or an MME 400 may discard the communication pattern.

The SCEF 410 may check the validity of the parameters in the communication pattern information at operation 425. For example, the SCEF 410 may check whether the SCS/AS 415 is authorized to request for the communication pattern information. The SCEF 410 may select a communication pattern parameter based on the operator's policy or configuration.

The SCEF 410 may send the HSS 405 a communication pattern parameter update request (update CP) parameter request) message including a selected communication pattern and/or validity time at operation 430.

The HSS 405 may include the received communication pattern and/or validity time in the UE subscription information of the UE at operation 435. That is, the HSS 405 may update the subscriber information of the UE.

The HSS 405 may send the SCEF 410 a communication pattern parameter update response (update CP parameter request) message at operation 440.

The SCEF 410 may send the SCS/AS 415 an Update Response message in response to the update request message at operation 445.

The MME 400 may receive the subscriber information of the UE which includes the communication pattern and/or validity time from the HSS 405 at operation 450. This information may be used in generating an expected UE behavior information element, expected UE activity behavior information element, and assistance data conveyed in a paging that are transferred to a base station or evolved node B (eNB) (not shown).

Figure 5:
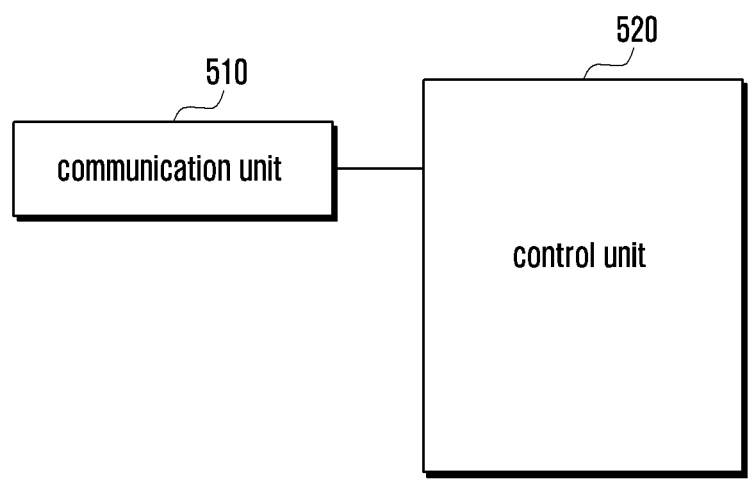
FIG. 5 is a block diagram illustrating a schematic configuration of a home subscriber server (HSS) according to an embodiment of the present disclosure.

FIG. 5 is a block diagram illustrating a schematic configuration of an HSS according to an embodiment of the present disclosure.

Referring to FIG. 5, the HSS may include a communication unit (or transceiver) 510 and a control unit (or processor) 520.

The communication unit 510 may communicate signals with another device (e.g. SCEF, MME, and SGSN) under the control of the control unit 520.

The control unit 520 may control the operations of the HSS (as described with reference to FIGS. 3 and 4) according to various embodiments of the present disclosure.

For example, the control unit 520 may control to receive a first request message (e.g., the message transmitted at operation 330 of FIG. 3) from the SCEF. If the monitoring event information (e.g., monitoring type) included in the first request message is set to 'loss of connectivity,' the first request message may further include a maximum detection time value.

If the monitoring event information is set to 'loss of connectivity,' the control unit 520 may set a mobility-related timer (e.g., subscribed periodic TAU/RAU timer) to a value based on the maximum detection time value included in the first request message. For example, the control unit 520 may set the mobility-related timer of the UE to a value less than the maximum detection time.

The control unit 520 may send a mobility management entity (e.g., MME and/or SGSN) a second request message (e.g., the message transmitted at operation 340 of FIG. 3) including the monitoring event information and mobility-related timer value of the UE.

If the communication pattern of the UE is changed, the control unit 520 may control to receive a fifth request message (e.g., the message transmitted at operation 430 of FIG. 4) including the first communication pattern parameter and the validity time of the first communication pattern parameter from the SCEF. The control unit 520 may also update the subscriber information of the corresponding UE based on the first communication pattern parameter and its validity time. The control unit 520 may also delete the first communication pattern parameter when the validity time expires. The control unit 520 may transmit the first communication pattern parameter information and validity time information to the mobility management entity.

Figure 6:
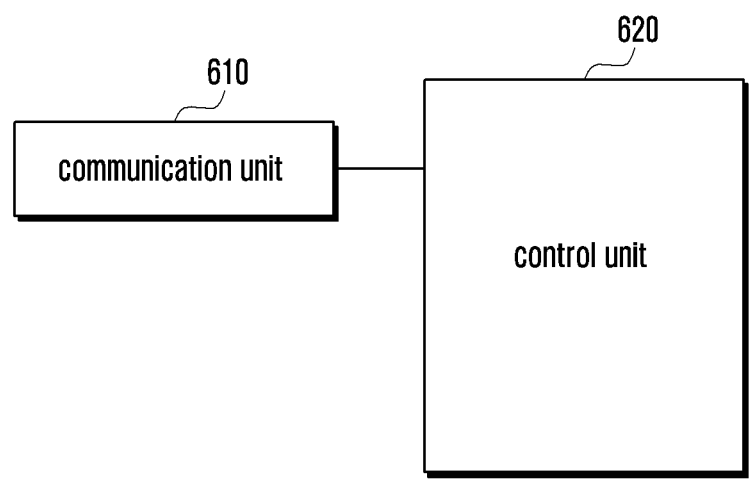
FIG. 6 is a block diagram illustrating a schematic configuration of an SCEF according to an embodiment of the present disclosure.

FIG. 6 is a block diagram illustrating a schematic configuration of an SCEF according to an embodiment of the present disclosure.

Referring to FIG. 6, the SCEF may include a communication unit (or transceiver) 610 and a control unit (or processor) 620.

The communication unit 610 may communicate signals with another device (e.g., AS/SCS and HSS) under the control of the control unit 620.

The control unit 620 may control the operation of the SCEF (as described with reference to FIGS. 3 and 4) according to various embodiments of the present disclosure.

For example, the control unit 620 may control to receive a first request message (e.g., the message transmitted at operation 420 of FIG. 4) from an external server (e.g., AS/SCS). If the monitoring event information (e.g., monitoring type) included in the first request message is set to 'loss of connectivity,' the first request message may further include a maximum detection time value.

The control unit 420 may send the HSS a second request message (e.g. the message transmitted at operation 430 of FIG. 4) including the monitoring event information. If the monitoring event information is set to 'loss of connectivity,' the second request message may further include the maximum detection time. The HSS may set the mobility-related timer (e.g., subscribed periodic TAU/RAU timer) to a value based on the maximum detection time value. The mobility-related timer value of the UE may be set to a value less than the maximum detection time.

If the communication pattern of the UE is changed, the control unit 620 may control to receive a sixth request message (e.g., the message transmitted at operation 420 of FIG. 4) including the first communication pattern parameter information and the validity time information of the first communication pattern parameter from the external server. The control unit 620 may also control to send the HSS a seventh request message (e.g., the message transmitted at operation 430 of FIG. 4) including the first communication pattern parameter information and the validity time information. The HSS may update the subscriber information of the corresponding UE based on the first communication pattern parameter and validity time. If the validity time information and the second communication pattern parameter information for the same validity time are provided, the control unit 620 may override the previously received first communication pattern parameter information.

Like the HSS and SCEF, each of the MME/SGSN and ACS/AS depicted in FIGS. 3 and 4 may include a communication unit and a control unit. The control unit may be implemented in the form of including a central processing unit (CPU) and a random access memory (RAM). The programs stored in a non-volatile memory are copied to the RAM and executed thereon to perform the above described operations.

As described above, the UE monitoring configuration method and apparatus of the present disclosure is advantageous in terms of providing the UE with a more suitable service based on the UE-related event information exchanged between an external server and a mobile communication system.

The term 'control unit' may be interchangeably used with the terms 'CPU,' 'microprocessor,' 'controller,' 'processor,' and 'operating system.' The control unit of each of the HSS, SCEF, MME, SGSN, and ACS/AS may be integrated with other function units including the transceiver of each of the HSS, SCEF, MME, SGSN, and ACS/AS into single chip system (e.g., system-on-a-chip, system on chip, SOC, and SoC).

The above-described methods according to various embodiments of the present disclosure may be coded in software so as to be stored in a non-transitory readable medium. The non-transitory readable medium may be mounted in various devices.

The non-transitory readable medium stores data semi-persistently, unlike a register, cache, and memory storing data temporarily, and readable by devices. Examples of the non-transitory readable medium include a compact disk (CD), a digital versatile disc (DVD), a hard disc, Blu-ray disc, a universal serial bus (USB) memory card, a memory stick, and a read only memory (ROM).

While the present disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a data management entity in a communication system, the method comprising:
   receiving, from an exposure function entity, a first message for subscribing one or more events, the first message including an identifier of an event to be monitored and a value of a maximum detection time;
   setting a periodic registration timer for a terminal to a value smaller than the value of the maximum detection time, in case that the identifier is associated with a loss of connectivity; and
   transmitting, to a mobility management function entity, a second message including the value associated with the periodic registration timer for the terminal.

2. The method of claim 1, wherein the identifier and the value of the maximum detection time are transmitted from an application function server to the exposure function entity.

3. The method of claim 1, further comprising:
   receiving, from the mobility management function entity, a response message acknowledging the second message; and
   transmitting, to the exposure function entity, a response message acknowledging the first message.

4. The method of claim 1, wherein the first message and the second message further include monitoring duration information indicating an absolute time related to a monitoring expiry.

5. The method of claim 1,
   wherein the first message and the second message further include a monitoring configuration deletion identifier, and
   wherein a monitoring configuration is deleted by the mobility management function entity based on the monitoring configuration deletion identifier.

6. A method performed by an exposure function entity in a wireless communication system, the method comprising:
   receiving, from an application function server, a first message for subscribing one or more events, the first message including an identifier of an event to be monitored and a value of a maximum detection time; and
   transmitting, to a data management entity, a second message including the identifier and the value of the maximum detection time,
   wherein a periodic registration timer for a terminal is set by the data management entity to a value smaller than the value of the maximum detection time, in case that the identifier is associated with a loss of connectivity, and
   wherein a third message including the value associated with the periodic registration timer for the terminal is transmitted from the data management entity to a mobility management function entity.

7. The method of claim 6,
   wherein a response message acknowledging the third message is transmitted from the mobility management function entity to the data management entity, and
   wherein the method further comprises receiving, from the data management entity, a response message acknowledging the second message.

8. The method of claim 6,
   wherein the second message and the third message further include monitoring duration information indicating an absolute time related to a monitoring expiry, and
   wherein the second message and the third message further include a monitoring configuration deletion identifier, and a monitoring configuration is deleted by the mobility management function entity based on the monitoring configuration deletion identifier.

9. A data management entity in a wireless communication system, the data management entity comprising:
   a transceiver; and
   a controller configured to:
      receive, from an exposure function entity via the transceiver, a first message for subscribing one or more events, the first message including an identifier of an event to be monitored and a value of a maximum detection time,
      set a periodic registration timer for a terminal to a value smaller than the value of the maximum detection time, in case that the identifier is associated with a loss of connectivity, and
      transmit, to a mobility management function entity via the transceiver, a second message including the value associated with the periodic registration timer for the terminal.

10. The data management entity of claim 9, wherein the identifier and the value of the maximum detection time are transmitted from an application function server to the exposure function entity.

11. The data management entity of claim 9, wherein the controller is further configured to:
    receive, from the mobility management function entity via the transceiver, a response message acknowledging the second message, and
    transmit, to the exposure function entity via the transceiver, a response message acknowledging the first message.

12. The data management entity of claim 9, wherein the first message and the second message further include monitoring duration information indicating an absolute time related to a monitoring expiry.

13. The data management entity of claim 9,
    wherein the first message and the second message further include a monitoring configuration deletion identifier, and
    wherein a monitoring configuration is deleted by the mobility management function entity based on the monitoring configuration deletion identifier.

14. An exposure function entity in a wireless communication system, the exposure function entity comprising:

a transceiver; and a controller configured to:

receive, from an application function server via the transceiver, a first message for subscribing one or more events, the first message including an identifier of an event to be monitored and a value of a maximum detection time, and transmit, to a data management entity via the transceiver, a second message including the identifier and the value of the maximum detection time, wherein a periodic registration timer for a terminal is set by the data management entity to a value smaller than the value of the maximum detection time, in case that the identifier is associated with a loss of connectivity, and wherein a third message including the value associated with the periodic registration timer for the terminal is transmitted from the data management entity to a mobility management function entity.

15. The exposure function entity of claim 14, wherein a response message acknowledging the third message is transmitted from the mobility management function entity to the data management entity, and wherein the controller is further configured to receive, from the data management entity via the transceiver, a response message acknowledging the second message.

16. The exposure function entity of claim 14, wherein the second message and the third message further include monitoring duration information indicating an absolute time related to a monitoring expiry, and wherein the second message and the third message further include a monitoring configuration deletion identifier, and a monitoring configuration is deleted by the mobility management function entity based on the monitoring configuration deletion identifier.

* * * * *